April 6, 1926.
T. A. DANAHER ET AL
CONDUIT
Filed Oct. 3, 1923
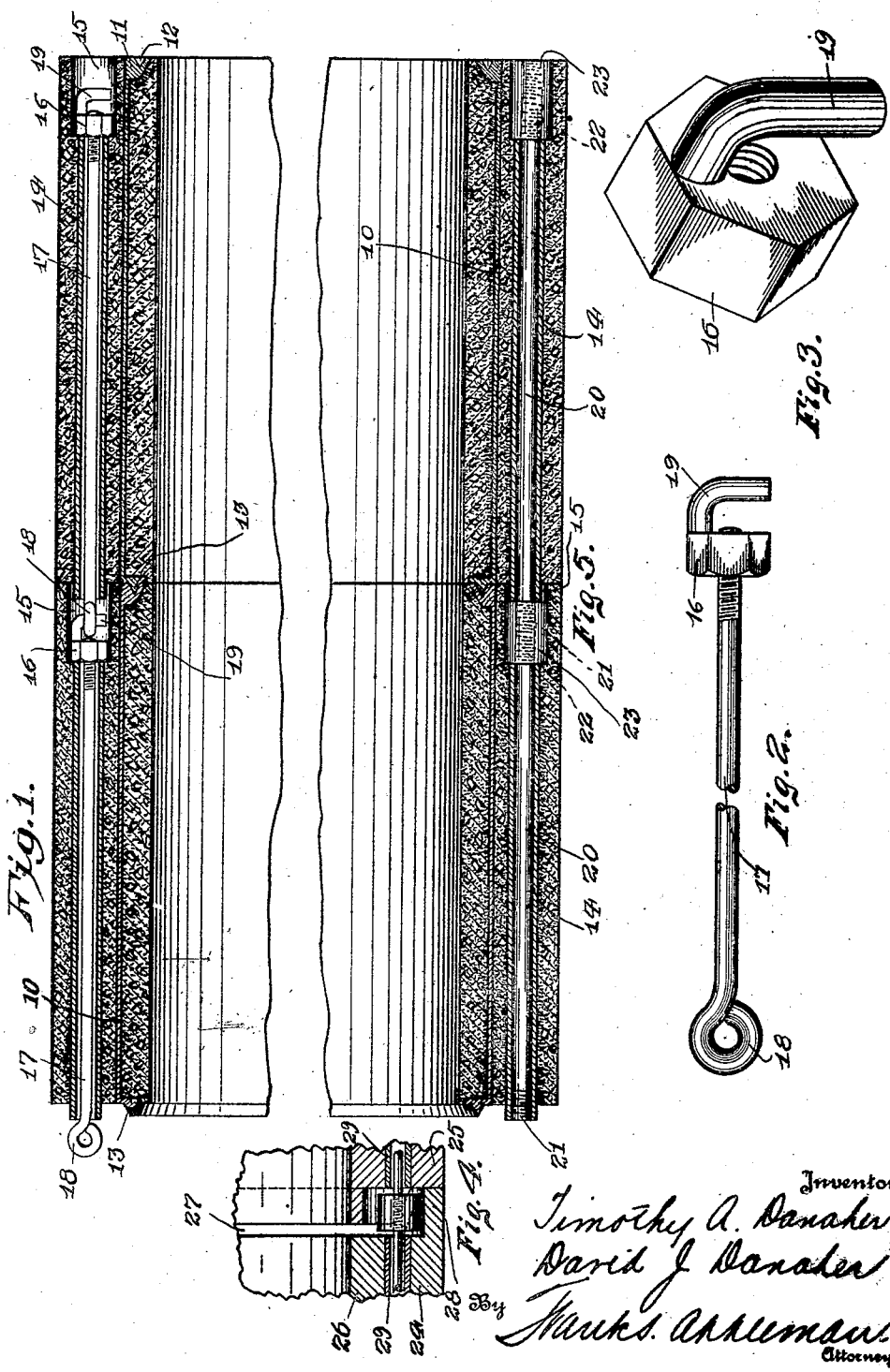

Patented Apr. 6, 1926.

1,579,285

UNITED STATES PATENT OFFICE.

TIMOTHY A. DANAHER AND DAVID J. DANAHER, OF JACKSON, MICHIGAN.

CONDUIT.

Application filed October 3, 1923. Serial No. 666,360.

*To all whom it may concern:*

Be it known that we, TIMOTHY A. DANAHER and DAVID J. DANAHER, citizens of the United States of America, and residents of Jackson, in the county of Jackson and State of Michigan, have invented certain new and useful Improvements in Conduits, of which the following is a specification.

This invention relates to composition pipes, and the said invention is produced primarily for use as a sewer pipe and also as a water pressure pipe.

An object of this invention is to produce a pipe arranged in sections, having novel means whereby the sections are bound together end to end to produce a leak-proof joint between the ends; and furthermore, the invention has for an object to produce pipe sections of the character indicated in which metal is encased in a plastic composition which serves to protect the metal from access of water thereto that might cause the metal to rust and deteriorate.

Furthermore, it is an object of this invention to produce pipe sections of the character indicated, having novel means whereby the sections may be successively secured together end to end and with such force as to prevent sagging of the pipe at the joints.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view of a pipe to be employed as a sewer conduit;

Figure 2 illustrates a detail view of the couplings employed between the pipe sections;

Figure 3 illustrates an enlarged perspective view of the nut and hook of said coupling;

Figure 4 illustrates a sectional view of fragments of pipe sections to be employed in constructing sewer conduits; and Fig. 5 illustrates a sectional view of a fragment of a pipe to be employed as a conduit, the said figure showing a different means for securing the sections of the conduit together.

In these drawings, and referring particularly to Fig. 1 as one embodiment of the invention of a sewer pipe or conduit, a metal pipe 10 is employed and it is encased or imbedded in a plastic composition which may be of any of the well known characters, as the inventors do not wish to be limited with respect to the ingredients or proportions of the materials entering into the production of the plastic portion of the pipe or conduit, it being desirable, of course, that the material shall be relatively strong and durable.

One end of each pipe section has a reinforcing bead 11 relatively heavy or thick as compared with the gage of the material forming the pipe, and this bead is provided with a circumferential recess in its face forming a seat 12 that is preferably V-shape or provided with converging walls in cross section. The opposite end of each metal portion or pipe of the conduit has an inwardly extending flange 13, the face of which is contoured approximately complemental to the contour of the seat 12 so that the sections of pipe when fitted together end to end will have interengaging joints that will serve to prevent leaks at the joints when the sections are secured together, as will presently appear.

In order to provide for binding the sections together end to end in a manner to prevent movement of one section with relation to the other, and in order to produce a rigid structure longitudinal tensioning members are employed that are removably applied to the sections of conduit so that if any tensioning member becomes impaired, it may be renewed. To the end just stated, a series or plurality of tubes 14 is embedded in the plastic composition at the time the same is cast or molded, and the tubes at one end preferably project beyond the plastic composition or terminate flush with or in close proximity to the end of the plastic composition, whereas at the opposite end recesses 15 are formed in the plastic composition, the areas of which are sufficiently great to receive nuts or fastenings 16 by which the tensioning members 17 are drawn longitudinally of the conduit.

In one embodiment of the invention, the tensioning members comprise rods, each of which has an eye 18 at one end, whereas the opposite end is threaded to engage a nut 16 and the nut has a hook or lug 19 that enters the eye 18 of the next succeeding tensioning member. The tensioning members are removably applied, as stated, to the tubes and when the conduit sections are properly positioned and joined, the manipulation of the nuts on the tensioning members will draw the sections together with such force as to prevent buckling of the sections or the existence of loose joints at the interengaging surfaces of the sections.

The beads and flanges may be integral with or they may be attached to the pipes, but preferably they are of some relatively soft material in order that the joints between them may be tightened through the application of force exerted by the tensioning members.

It is also possible to produce tensioning members comprising rods 20, the opposite ends of which are threaded, as shown at 21 and 22, the threaded ends being connected by a threaded sleeve 23 located in the recesses 15, but the preferred construction for sewer conduits is that first described, whereas the last described tensioning device is believed to be better adapted for use in connection with the production of water conduits.

This last mentioned construction is shown in the modification Fig. 5, and the pipe 10' is imbedded in the concrete, as heretofore explained, and tubes 14' are utilized for the rods 20 in the same manner as the tubes 14 are provided for the rods 17 in Fig. 1.

When the sections are assembled as shown in Fig. 1, it is desirable that a waterproof filler of some known type should be interposed between the surfaces of the interlocking sections before the said sections are put together in order that when the sections are drawn together, leaks will not develop.

Among the advantages for the construction is the elimination of cemented joints; and furthermore, it has been found that by using sections of the character described, the sewer construction may be carried on even though the sections are submerged.

Referring to the modification shown in Figs. 4 and 5, sections of conduit 24 and 25 are produced with reinforcing pipe sections 26, the same as in the construction referred to in Fig. 1, but in this modified form, one end of each section has a recess or seat 27 having a tapered wall at one end and a projection or flange 28 at the opposite end, the surface of the flange being tapered to fit the tapered seat of the next succeeding section, thus making it possible to employ the sections end to end in order that they will interengage to produce joints that can be secured against leaks by the introduction of gaskets or the like.

In this last mentioned construction, tubes 29 are inserted in the plastic composition in the same manner as that described in connection with the disclosure of Fig. 1 and the tubes contain tensioning members similar to those heretofore described so that the sections may be drawn together and the joints between the sections made rigid.

We claim:

1. In a sectional conduit, conduit sections each comprising a metal pipe having a plastic sheathing on its inner and outer surfaces and tubes imbedded in the sheathing, one end of each section having recesses with which the tubes communicate, an inwardly extending flange at one end of the pipe, a bead on the opposite end of said pipe, the faces of the said flange and bead having complemental configurations whereby the end of one section will interengage the end of the succeeding section, tensioning members extending through the tubes, and interengaging elements for connecting the adjacent ends of the tensioning members.

2. In a sectional conduit, conduit sections each comprising a metal pipe having a plastic sheathing on its inner and outer surfaces and tubes imbedded in the sheathing, one end of each section having recesses with which the tubes communicate, an inwardly extending flange at one end of the pipe, a bead on the opposite end of said pipe, the faces of the said flange and bead having complemental configurations whereby the end of one section will interengage the end of the succeeding section, tensioning members extending through the tubes, the said tensioning members each having an eye on one end and threads at the other end, a nut threaded on the tensioning member and having a hook adapted to enter the eye of the adjacent tensioning member for exerting a pull on the conduit sections, substantially as described.

TIMOTHY A. DANAHER.
DAVID J. DANAHER.